United States Patent Office 3,375,302
Patented Mar. 26, 1968

3,375,302
THERMOPLASTIC BLEND OF ABS RESIN AND AMORPHOUS, LINEAR POLYPROPYLENE AND PROCESS FOR MAKING SAME
Shinji Iwai and Naoki Yoshimi, Tokyo, Shigenobu Mita, Yokohama, and Chuji Shiode, Tokyo, Japan, assignors of one-third each to Shinji Iwai, Tokyo, Japan, Fudo Kagaku Kogyo Kabushiki Kaisha and Chisso Corporation, both of Tokyo, Japan, both corporations of Japan
No Drawing. Filed Oct. 9, 1964, Ser. No. 402,919
Claims priority, application Japan, Oct. 15, 1963, 38/55,287
15 Claims. (Cl. 260—876)

ABSTRACT OF THE DISCLOSURE

Thermoplastic blend of an ABS resin and a small amount of amorphous polypropylene having an average molecular weight of between 10,000 and 100,000. The blend has improved melt flowing properties and a higher heat distortion temperature.

---

This invention relates to improved ABS resin compositions. More particularly, the present invention relates to the improved ABS resin compositions which can be prepared by blending ABS resin with amorphous polypropylene of linear molecular structure.

Generally, it is required for synthetic resin that it satisfies various requirements. For example, there are such requirements which may be used as the standards for evaluating the properties of molded articles as good appearance, excellent mechanical strength, excellent heat, light, and chemical stability. On the other hand, it is also important from the processing point of view that resin can be processed efficiently at relatively low temperature. If it is able to improve the processing properties of synthetic resin in this manner, not only molded articles of good quality can be obtained because of thermal decomposition of resin on processing being prevented, but also it is remarkably economic since the efficiency of processing can be improved.

Various kinds of ABS resin now on the market in great quantities are received favourably because of their excellent impact strength. However, when considering them as the materials for injection molding, there is a fault common in all type of ABS resin that on molding process they must be heated to a temperature of higher than 200° C. due to their poor melt flowing properties. However, in injection molding or extrusion molding process in which resin will be subjected to high temperature for relatively many hours, because of thermal decomposition ABS resin shows discoloration and deterioration of the quality, and does not release from the mold smoothly. This tendency is especially remarkable when molding machine of large size is used, and molding efficiency does not increase compared to other injection molding materials.

For the purpose of improving their faults, adequate quantities of petroleum wax or hydrogenated rosin are blended to ABS resin to improve melt flowing properties, and it is the fact that various kinds of ABS resin on the market are blended with these kinds of agents which improve melt flowing properties. However, ABS resin blended with these agents generally exhibits lowered heat distortion temperature and impact strength.

It has been found by the present inventors that melt flowing properties of ABS resin can be improved with such merits inherent in ABS resin as high heat distortion temperature and high impact strength being scarcely damaged when amorphous polypropylene of linear molecular structure is blended to ABS resin. As the result, processability of ABS resin is extremely improved, and therefore, it is obvious that the present invention is really of great industrial value.

As above described, this invention is thus effective on ABS resin which is not blended with certain additives. Besides, the present inventors also have found that when amorphous polypropylene is blended to commercial ABS resin which is already blended with some agents which improve melt flowing properties, its heat distortion temperature is elevated as well as its melt flowing properties are improved. Furthermore, it has also been found that these compositions easily release from the mold when molded, showing good finished surfaces.

For example, when amorphous polypropylene is blended to ABS resin which is obtained by blending styrene-acrylonitrile copolymer with butadiene-acrylonitrile copolymer, the composition thus obtained shows remarkably improved melt flowing properties, though its heat distortion temperature is slightly lowered compared to those without amorphous polypropylene. As the result, its processing temperature can be lowered by from several degrees to more than 10° C. and the composition having good impact strength is obtained.

Furthermore, when ABS resin on the market is blended with amorphous polypropylene, not only its melt flowing properties are improved but also its heat distortion temperature is elevated by from about 3° C. to 6° C.

ABS resin used for practicing this invention may be those of blend type, graft type, and mixture type of preceding two types. Ratio of components of ABS resin is roughly within the range of from 20 to 30% (by weight; the same shall apply hereinafter) of acrylonitrile, from 20 to 30% of butadiene, and from 40 to 60% of styrenes.

The basic resin of blend type is a blend consisting of from 50 to 10% of nitrile rubber and from 50 to 90% of styrene-acrylonitrile copolymer, and especially what consists of 30 parts of the former and 70 parts of the latter is considered to be a standard blend. Nitrile rubber is butadiene-acrylonitrile copolymer containing from 15 to 45%, preferably from 28 to 32%, of acrylonitrile from a standpoint of transparency and strength. Styrene-acrylonitrile copolymer contains from 15 to 50%, preferably from 20% to 28%, of acrylonitrile.

ABS resin of graft type is prepared by polymerising a mixture consisting of acrylonitrile monomer and styrene monomer in latex consisting of homopolymer or copolymer of butadiene. Generally, as it is difficult to obtain perfect graft polymer, ABS resin of graft type is obtained as a mixture of graft polymer, polybutadiene, and acrylonitrile-styrene copolymer. They are on the market with the trademarks of Cycolac, Lustran, GR–S, etc.

Standard constitution of graft type ABS resin when using butadiene homopolymer consists of 30% of polybutadiene (which is used as the form of latex), 25% of acrylonitrile, and 45% of styrene. There also exists ABS resin of high-butadiene content type which consists of 50% of polybutadiene, 18% of acrylonitrile, and 32% of styrene. When using butadiene copolymer, ABS resin of this type is prepared by polymerising from 55 to 95% of a mixture consisting of from 10 to 40% of acrylonitrile and from 90 to 60% of styrene in 45 to 5% butadienes-tyrene copolymer containing from 40 to 75% of butadiene (which is used as the form of latex).

Furthermore, we can show as an example of mixture type ABS resin what is prepared by blending from 50 to 70% of polymerization product obtained by polymerizing a mixture consisting of from 10 to 30% of acrylonitrile and from 70 to 30% of styrene in an aqueous latex containing from 20 to 60% of polybutadiene, and 50 to 30% of acrylonitrile-styrene copolymer which contains from 20 to 30% of acrylonitrile.

Among these copolymer components, for styrene, styrene derivative which has such substituent as α-methyl styrene may be used.

Amorphous polypropylene which can be used for the present invention denotes high molecular weight polymer of linear molecular structure prepared by polymerization of propylene, and more particularly, amorphous propylene polymer of what is essentially regarded as amorphous polymer even if it shows crystallinity more or less. Those which have molecular weight of from about 10,000 to 100,000 are preferred.

In order to attain the purpose of the present invention, blending proportion of amorphous polypropylene to the composition must be more than 0.5%, but those of more than 15% are not desirable from the standpoint of strength of the composition. Generally, those within the range of from 0.5% to 10% are effective.

The composition of this invention can be prepared by mixing ABS resin with certain quantities of amorphous polypropylene at adequate temperature with adequate equipment for a period sufficient to insure that the materials are thoroughly homogenized, and then, after cooling the blended composition, crushing the composition into desired forms or pelletizing the composition with adequate equipment. For mixing, such mixing equipments with high mixing effect as roll or Banbury mixer are desirable, and generally mixing temperature of no greater than 180° C. is satisfactory, though it depends on used equipment and types of ABS resin.

In the case of manufacturing the ABS resin composition from ABS resin obtained by blending styrene-acrylonitrile copolymer with nitrile rubber, manufacturing process can be proceeded smoothly and improved ABS resin composition of this invention can be obtained with the following sequences, for amorphous polypropylene does not exhibit sufficient solubility in styrene-acrylonitrile copolymer, while it is quite soluble in nitrile rubber; that is, at first, nitrile rubber is mixed with amorphous polypropylene at low temperature to obtain a homogeneous composition, and then styrene-acrylonitrile copolymer is mixed with this composition at elevated temperature.

If desired, on mixing process as above described, any dyes (e.g., phthalocyanine dyes) or pigments (e.g., titanium oxide, carbon black) can be added.

The following examples illustrate the process of the invention. Test results on the physical properties shown in the examples are mean values of tests held three times, respectively, with the following test methods.

(1) Melt flowing properties Koka-type flow tester (used nozzle; 1 mm. x 2 mm. long):

Testing temperature _____° C__ 180±1.5
Load _____kg./cm.$^2$__ 50

(2) Heat distortion temperature ASTM D–648:

Temperature elevating speed _____° C./min__ 2
Load _____p.s.i__ 264

(3) Impact strength Charpy-type impact tester (60 kg. cm./cm.$^2$):
Test piece, 10 mm. x 13 mm., U-notched with 2 mm. wide and 2 mm. deep.

EXAMPLES 1–3

30 weight parts of commercial nitrile rubber having molecular weight of about 400,000 and certain quantities of amorphous polypropylene having molecular weight of about 32,000 (which is described as A-PP in the tables) are mixed together at room temperature with roll. This mixture is then mixed with 70 weight parts of styrene-acrylonitrile copolymer having molecular weight of about 90,000 which contains about 30% of acrylonitrile with the aid of two rollers at a temperature of from 170 to 180° C. to obtain a homogeneous composition. Composition thus obtained as board form is then cooled and crushed to molded powder. Molded powder with desired constitution is thus obtained.

The physical properties of the composition which contain amorphous polypropylene with various proportions are shown in Table 1.

Control 1 is what does not contain amorphous polypropylene

TABLE 1

| Example | A-PP content (percent) | Melt flowing properties (cm.$^3$/sec.) | Heat distortion temperature (° C.) | Impact strength (kg. cm./cm.$^2$) Room temp. | 0° C. | −25° C. |
|---|---|---|---|---|---|---|
| 1 | 1.0 | 3.7×10$^{-3}$ | 85.0 | >60 | 40.0 | 12.0 |
| 2 | 2.0 | 5.1×10$^{-3}$ | 84.8 | >60 | 40.8 | 12.0 |
| 3 | 5.0 | 6.2×10$^{-3}$ | 85.0 | >60 | ------ | 12.0 |
| Control 1 | 0.0 | 1.3×10$^{-3}$ | 89.0 | >60 | 41.1 | 15.9 |

As obvious from the results shown in Table 1, though heat distortion temperature is slightly lowered, melt flowing properties are remarkably improved, its inherent high impact strength being maintained as it was.

EXAMPLES 4–5

ABS resin which is prepared by polymerizing a mixture consisting of 25 weight parts of acrylonitrile monomer and 45 weight parts of styrene monomer in polybutadiene latex containing 30 weight parts of polybutadiene is mixed with certain quantities of amorphous polypropylene having molecular weight of about 20,000 at a temperature of from 160 to 170° C. Sheets made up from the compositions which contain certain quantities of amorphous polypropylene are crushed to powder after being cooled.

The results obtained are shown in Table 2. Control 2 shows the results of what does not contain amorphous polypropylene.

TABLE 2

| Example | A-PP content (percent) | Melt flowing properties (cm.$^3$/sec.) | Heat distortion temp. (° C.) | Impact strength at room temp. (kg. cm./cm.$^2$) |
|---|---|---|---|---|
| 4 | 5 | 1×10$^{-2}$ | 86.7 | 37.5 |
| 5 | 10 | 7×10$^{-2}$ | 87.5 | 30.0 |
| Control 2 | 0.0 | 1.5×10$^{-3}$ | 86.1 | 39.5 |

EXAMPLES 6–7

ABS resin which prepared by polymerizing the mixture consisting of 25 weight parts of acrylonitrile monomer and 45 weight parts of sytrene monomer in 30 weight parts of butadiene-styrene copolymer containing 75% of butadiene (which is used as latex) is used. Molded powder was obtained with the same process as described in the previous example. The physical properties of the molded powder are shown in Table 3.

Control 3 shows the results of what does not contain amorphous polypropylene.

TABLE 3

| Example | A-PP Content (percent) | Melt flowing properties (cm.$^3$/sec.) | Heat distortion temp. (° C.) | Impact strength at room temp. (kg. cm./cm.$^2$) |
|---|---|---|---|---|
| 6 | 5 | 1.5×10$^{-2}$ | 89.0 | 15.7 |
| 7 | 10 | 4×10$^{-2}$ | 90.5 | 15.5 |
| Control 3 | 0.0 | 0.5×10$^{-2}$ | 87.0 | 11.1 |

EXAMPLES 8-22

ABS resin whose trade-mark is Cycolac (H) is used. This ABS resin belongs to graft type, and results of analysis illustrate that it consists of about 22% of acrylonitrile, about 58% of styrene, and about 20% of butadiene. ABS resin above described is mixed with certain quantities of three types of amorphous polypropylene each of which have molecular weight of about 32,000, 45,000 and 82,000 (hereinafter designated as L, M, and H) at a temperature of from 160 to 170° C. Sheets made up from the compositions which contain certain quantities of amorphous polypropylene are crushed to powder after being cooled. The physical properties of the compositions which are different from each other in content of amorphous polypropylene are shown in Table 4.

Control 4 shows the values of Cycolac (H) which is used in these examples.

TABLE 4

| Example | A-PP Type | A-PP Content (percent) | Melt flowing properties (cm.³/sec.) | Heat distortion temp. (° C.) | Impact strength at room temp. (kg. cm./cm.²) |
|---|---|---|---|---|---|
| 8 | L | 0.5 | $1.55 \times 10^{-2}$ | 83.1 | |
| 9 | L | 1.0 | $1.55 \times 10^{-2}$ | | |
| 10 | L | 3.0 | $1.70 \times 10^{-2}$ | 84.8 | 29.3 |
| 11 | L | 6.0 | $2.30 \times 10^{-2}$ | 88.0 | 27.8 |
| 12 | L | 10.0 | $2.85 \times 10^{-2}$ | 87.8 | 19.1 |
| 13 | L | 15.0 | $3.40 \times 10^{-2}$ | 87.2 | |
| 14 | M | 0.5 | $1.50 \times 10^{-2}$ | 83.7 | 32.7 |
| 15 | M | 1.0 | $1.57 \times 10^{-2}$ | | |
| 16 | M | 3.0 | $1.95 \times 10^{-2}$ | 86.1 | 29.7 |
| 17 | M | 6.0 | $2.45 \times 10^{-2}$ | 86.7 | 26.3 |
| 18 | M | 10.0 | $2.80 \times 10^{-2}$ | 88.2 | 18.3 |
| 19 | M | 15.0 | $3.45 \times 10^{-2}$ | 86.8 | |
| 20 | H | 1.0 | | 83.5 | |
| 21 | H | 3.0 | $1.1 \times 10^{-2}$ | 87.0 | 29.5 |
| 22 | H | 6.0 | $1.0 \times 10^{-2}$ | 88.2 | 24.3 |
| Control 4 | | 0.0 | $1.5 \times 10^{-2}$ | 82.7 | 32.6 |

In these examples, heat distortion temperature is remarkably improved though melt flowing are not improved so much.

EXAMPLES 23-27

With the same process as described in Examples 8-22 except that ABS resin whose trade-mark is Abson is used, molded powder of this invention was obtained. The physical properties of this powder are shown in Table 5. Control 5 shows the values of Abson which is used in these examples.

TABLE 5

| Example | A-PP Type | A-PP Content (percent) | Melt flowing properties (cm.³/sec.) | Heat distortion temp. (° C.) | Impact strength at room temp. (kg. cm./cm.²) |
|---|---|---|---|---|---|
| 23 | L | 3.0 | $2.0 \times 10^{-2}$ | 90.6 | 17.4 |
| 24 | L | 6.0 | $2.45 \times 10^{-2}$ | 90.9 | 15.1 |
| 25 | M | 3.0 | $2.0 \times 10^{-2}$ | 90.1 | 18.2 |
| 26 | M | 6.0 | $2.25 \times 10^{-2}$ | 90.7 | 14.7 |
| 27 | H | 3.0 | $1.3 \times 10^{-2}$ | 91.2 | 18.9 |
| Control 5 | | 0.0 | $2.0 \times 10^{-2}$ | 87.0 | 21.0 |

In these examples, heat distortion temperature is improved.

EXAMPLES 28-31

With the same process as described in Examples 8-22 except that ABS resin whose trade-mark is Lustran is used, molded powder of this invention was obtained. The properties of this powder are shown in Table 6. The values of control 6 are those Lustran shows.

TABLE 6

| Example | A-PP Type | A-PP Content (percent) | Melt flowing properties (cm.³/sec.) | Heat distortion temp. (° C.) | Impact strength at room temp. (kg. cm./cm.²) |
|---|---|---|---|---|---|
| 28 | L | 3.0 | $1.5 \times 10^{-2}$ | 89.8 | 8.5 |
| 29 | L | 6.0 | $2.2 \times 10^{-2}$ | 90.6 | 6.1 |
| 30 | M | 3.0 | $1.5 \times 10^{-2}$ | 89.2 | 7.1 |
| 31 | H | 3.0 | $1.0 \times 10^{-2}$ | 89.9 | 7.8 |
| Control 6 | | 0.0 | $7.8 \times 10^{-3}$ | 86.7 | 10.9 |

Both melt flowing properties and heat distortion temperature are improved in these examples.

What is claimed is:

1. As a new composition of matter, a thermoplastic blend of (A) an ABS resin selected from the group consisting of a blended mixture of styrene-acrylonitrile copolymer and butadiene-acrylonitrile rubbery copolymer, a graft polymerization product obtained by polymerizing a mixture of acrylonitrile and styrene monomer in the presence of a latex having either a homopolymer of butadiene or a copolymer of butadiene-styrene, and a blended mixture of the above-recited graft polymer with styrene-acrylonitrile copolymer, and (B) a substantially amorphous linear polypropylene having an average molecular weight of between 10,000 and 100,000, in relative proportions of from 85 to 99.5% of (A) and correspondingly from 15 to 0.5% of (B), said percentages being by weight based on the sum of (A) and (B) and totalling 100%.

2. A composition of matter as in claim 1 wherein an amorphous, linear polypropylene is a polymer having an average molecular weight of about 20,000.

3. A composition of matter as in claim 1 wherein an amorphous, linear polypropylene is a polymer having an average molecular weight of about 32,000.

4. A composition of matter as in claim 1 wherein an amorphous, linear polypropylene is a polymer having an average molecular weight of about 45,000.

5. A composition of matter as in claim 1 wherein an amorphous, linear polypropylene is a polymer having an average molecular weight of about 82,000.

6. A composition of matter as in claim 1 wherein an ABS resin is a blend of a rubbery copolymer consisting of 15 to 45% by weight of acrylonitrile and 85 to 55% by weight of butadiene, and a resinous copolymer consisting of 15 to 50% by weight of acrylonitrile and 85 to 50% by weight of styrene, in relative proportions of from 10 to 50% of a rubbery copolymer and correspondingly from 90 to 50% of a resinous copolymer, said percentages being by weight based on the sum of a rubbery copolymer and a resinous copolymer and totalling 100%.

7. A composition of matter as in claim 6 wherein the rubbery copolymer and the resinous copolymer are present in substantially the ratio by weight of 30:70.

8. A composition of matter as in claim 7 wherein the resinous copolymer is the copolymer consisting of 30% by weight of acrylonitrile and 70% by weight of styrene and having an average molecular weight of about 90,000.

9. A composition of matter as in claim 7 wherein the rubbery copolymer is the copolymer having an average molecular weight of about 400,000.

10. A process for producing a composition of matter as in claim 6 which comprises mixing an amorphous, linear polypropylene with a rubbery copolymer consisting of acrylonitrile and butadiene to form a homogeneous composition, and, thereafter, blending said homogeneous composition, at elevated temperature, with a resinous copolymer consisting of acrylonitrile and styrene.

11. A composition of matter as in claim 1 wherein an ABS resin is a polymerization product obtained by polymerizing 55 to 95% by weight of a mixture consisting of 10 to 40% by weight of acrylonitrile and 90 to 60% by weight of styrene in an aqueous latex containing 45 to 5% by weight of a rubbery copolymer consisting of 40 to 75% by weight of butadiene and 60 to 25% by weight of styrene.

12. A composition of matter as in claim 1 wherein the ABS resin is the polymerization product obtained by polymerizing the mixture consisting of 25% of acrylonitrile and 45% of styrene in the aqueous latex containing 30% of the rubbery copolymer consisting of 75% by weight of butadiene and 25% by weight of styrene, said percentages being by weight based on the sum of acrylonitrile, styrene, and the rubbery copolymer and totalling 100%.

13. A composition of matter as in claim 1 wherein an ABS resin is a polymerization product obtained by polymerizing a mixture consisting of from 10 to 30% of acrylonitrile and from 30 to 70% of styrene in an aqueous latex containing from 20 to 60% of polybutadiene, said percentages being by weight based on the sum of acrylonitrile, styrene, and polybutadiene and totalling 100%.

14. A composition of matter as in claim 1 wherein the ABS resin is the polymerization product obtained by polymerizing the mixture of 25% of acrylonitrile and 45% of styrene in the aqueous latex containing 30% of polybutadiene, said percentages being by weight on the sum of acrylonitrile, styrene, and polybutadiene and totalling 100%.

15. A composition of matter as in claim 1 wherein the ABS resin is a blended mixture of 50–70% by weight of polymerization product obtained by polymerizing a mixture consisting of 10 to 30% acrylonitrile and 70 to 30% of styrene in the presence of aqueous latex containing from 20 to 60% of polybutadiene, and 50–30% by weight of a copolymer of an acrylonitrile-styrene which contains from 20 to 30% of acrylonitrile.

References Cited

UNITED STATES PATENTS

| | | | |
|---|---|---|---|
| 3,118,854 | 1/1964 | Hess et al. | 260—876 |
| 3,210,301 | 10/1965 | White | 260—4 |
| 3,267,069 | 8/1966 | Cummings | 260—880 X |
| 3,271,340 | 9/1966 | Shearer et al. | 260—897 X |
| 3,310,604 | 3/1967 | Steingiser et al. | 260—897 X |

GEORGE F. LESMES, *Primary Examiner.*